H. SPRINGER.
Seed-Drill Teeth.
No. 211,601. Patented Jan. 21, 1879.
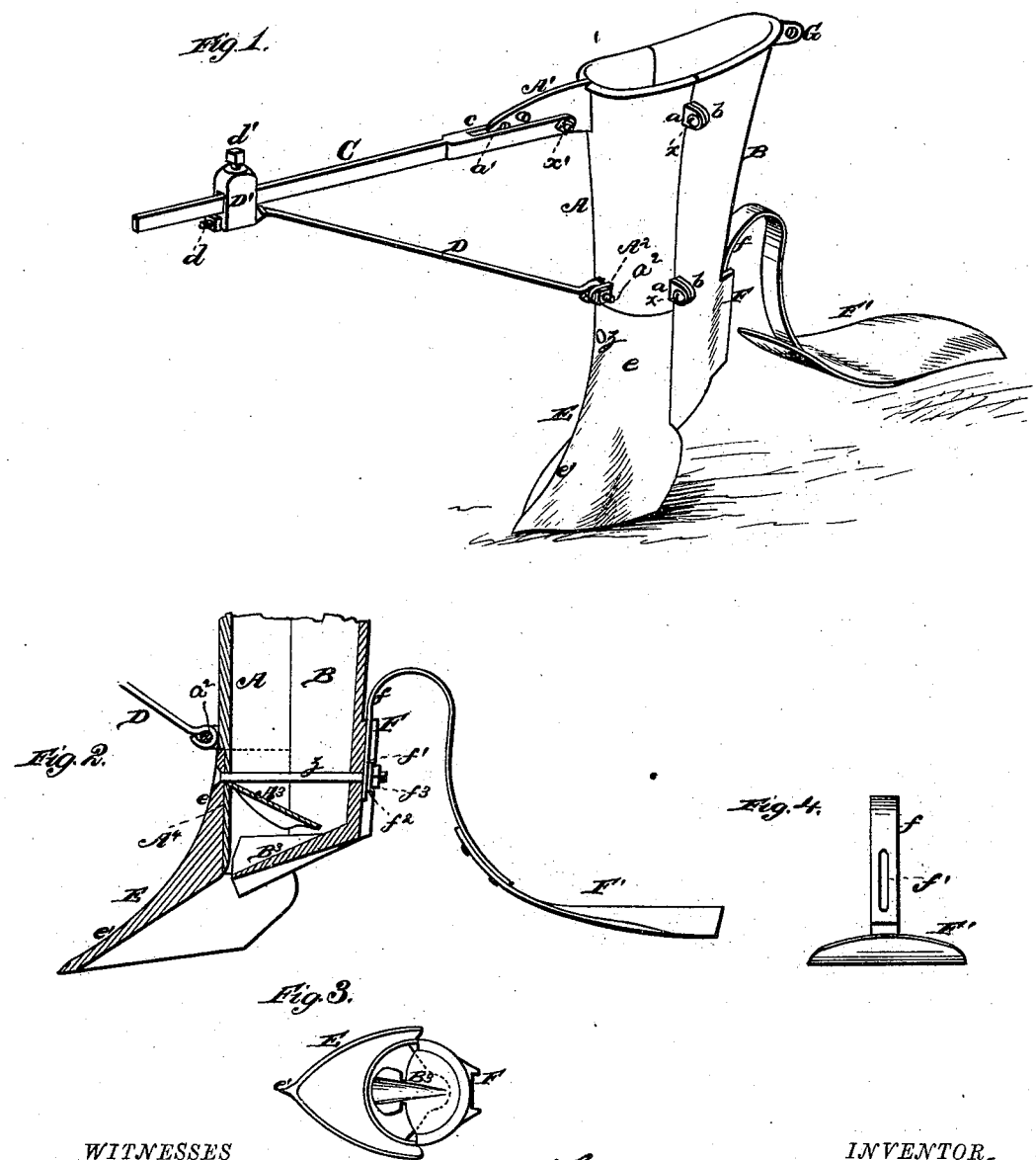

UNITED STATES PATENT OFFICE.

HENRY SPRINGER, OF VICKSBURG, MICHIGAN.

IMPROVEMENT IN SEED-DRILL TEETH.

Specification forming part of Letters Patent No. 211,601, dated January 21, 1879; application filed November 30, 1878.

*To all whom it may concern:*

Be it known that I, HENRY SPRINGER, of Vicksburg, in the county of Kalamazoo and State of Michigan, have invented a new and valuable Improvement in Seed-Drill Teeth; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my seed-drill teeth. Fig. 2 is a longitudinal central sectional view of the same, and Figs. 3 and 4 are detail views.

My invention relates to a hoe and shovel for seed-drills; and the novelty consists in the construction and arrangement of parts, as will be more fully hereinafter set forth, and pointed out in the claims.

Referring to the drawings, which form a part of this specification, A represents the front of the leg, and B the back. These portions are formed half-cylindrical, and are secured together firmly to form the hollow planting-tooth. Perforated lugs $a$ $a$ on the portion A and corresponding lugs $b$ $b$ on the portion B, with proper bolts or screws $x$, afford the means for such attachment.

A forwardly-projecting flange, $A^1$, is perforated at $a^1$ $a^1$ to receive a bolt, $x'$, which secures the tooth to the beam C, which has a bifurcated extremity, $c$, to embrace the flange $A^1$, and through these bifurcations the bolt $x'$ passes.

It will be observed that this construction allows proper adjustment at will, as the different holes $a^1$ are used.

$A^2$ represents two standards on the front of the portion A, having central recess and lateral perforation to receive a shaft, $a^2$, on which is loosely hung the draw-bar D, having a threaded portion, $d$, on the forward end, and nuts, as shown. This portion works in a mortised block, D′, which operates on the beam, and it may be secured at any point desired by means of a set-screw, $d'$.

It is obvious that this construction allows the operator to set the tooth readily at any desired angle to accommodate the condition or quality of soil.

I have discovered that improved efficient results follow a double or compound distributer. To this end I attach or cast in one piece with the portion A, upon its inner surface, near the base, an upper distributer, $A^3$, which, having lateral inclines in both directions, has also a backward incline, which tends to divide the seed laterally, and also to throw it backward upon the portion B, from whence it gravitates upon another distributer, $B^3$, at the bottom of the tube, whereby it is evenly distributed in the furrows made by the tooth and within its hollow or inner surface under the shovel. This compound distributer insures a thorough division and even scattering of the seed in the furrow.

The lower front portion of the piece A is formed to furnish a broad bearing, $A^4$, for the half-sleeve $e$ of the shovel E, to which and the part B it is secured by bolt $z$.

The shovel has a concave internal formation, which allows sufficient room for the even distribution of the seed in the furrow, and it has a cutting-edge, $e'$, along its central longitudinal front, which enables it to cut the soil and pass through the same with less friction.

Upon the back of the piece B, near the bottom, is a guideway, F, through which passes the bolt $z$, and it is adapted to receive the shank $f$ of the spring-coverer F′. This shank has a curvature sufficient to furnish a spring action to the coverer, and a slot receives the bolt at $f^1$, such slot allowing vertical adjustment at will. A washer, $f^2$, and nut $f^3$ are the securing means, and they may readily be removed, if desired.

G represents a perforated lug for attaching the ordinary chain to the tooth.

What I claim as new, and desire to secure by Letters Patent, is—

1. The drill-tooth and shovel described, made of the front piece, A, having perforated ears $a$, the rear piece, B, having perforated ears $b$, the part $A^4$, and the shovel E $e$, secured together and operating as and for the purpose set forth.

2. The adjustable block D′, having set-screw $d'$, and bifurcated beam C $c$, in combination with the adjustable draw-rod or brace D and the attachments $A^1$ $A^2$ $a^2$ to the drill-tooth, as shown and specified.

3. The double distributer described, consisting of the upper inclined part, $A^3$, upon the piece A and the part $B^3$ upon the piece B, inclined in reverse directions, as and for the purpose set forth.

In testimony that I claim the above I have hereunto subscribed my name in the presence of two witnesses.

HENRY SPRINGER.

Witnesses:
J. H. BOSTWICK,
C. W. BOWEN.